United States Patent [19]

Imura et al.

[11] 4,140,653
[45] Feb. 20, 1979

[54] SOLID SUPPORT FOR LIQUID CHROMATOGRAPHY

[75] Inventors: Shinichi Imura; Kazuyuki Fukano, both of Shin-Nanyo, Japan

[73] Assignee: Toyo Soda Manufacturing Co., Ltd., Yamaguchi, Japan

[21] Appl. No.: 840,116

[22] Filed: Oct. 6, 1977

Related U.S. Application Data

[62] Division of Ser. No. 695,052, Jun. 11, 1976, abandoned.

[30] Foreign Application Priority Data

Sep. 30, 1975 [JP] Japan ................................ 50-117276

[51] Int. Cl.$^2$ ...................... B01J 31/02; B01D 57/00; B01D 57/00
[52] U.S. Cl. .................................. 252/430; 252/428; 210/198 C; 210/502; 55/386
[58] Field of Search .............................. 252/430, 428; 210/198 C, 502; 55/386

[56] References Cited

U.S. PATENT DOCUMENTS

| 3,488,922 | 1/1970 | Kirkland | 210/198 C |
| 3,502,217 | 3/1970 | Brückner et al. | 252/430 X |
| 3,577,266 | 5/1971 | Kirkland et al. | 210/198 C X |
| 3,663,263 | 5/1972 | Bodre et al. | 210/198 C X |
| 3,722,181 | 3/1973 | Kirkland et al. | 210/198 C X |
| 3,941,718 | 3/1976 | Barabas et al. | 427/192 X |
| 3,956,179 | 5/1976 | Sebestian et al. | 252/428 X |
| 4,045,353 | 8/1977 | Kosaka | 210/502 |

*Primary Examiner*—Delbert E. Gantz
*Assistant Examiner*—William G. Wright
*Attorney, Agent, or Firm*—Oblon, Fisher, Spivak, McClelland & Maier

[57] ABSTRACT

In an apparatus for liquid chromatography the improvement which comprises a chromatographic column packed with a solid packing material comprising porous silica gel particles, having a specific surface area of 5 to 1500 m$^2$/g, an average pore diameter of 20 to 2000 Å and a crosslinked polymer selected from the group consisting of polystyrene, sulfonated polystyrene, polymethyl methacrylate and polyacrylonitrile coating the surface of the fine holes of the porous silica gel particles in an amount of 5 to 50 wt.% of the polymer to silica gel particles, wherein said crosslinked polymer does not contain any extractable polymer.

9 Claims, 9 Drawing Figures

SOLID SUPPORT FOR LIQUID CHROMATOGRAPHY

This is a division of application Ser. No. 695,052 now abandoned, filed June 11, 1976.

BACKGROUND OF THE INVENTION

1. Field of the Invention

The present invention relates to a process for preparing a solid support for liquid chromatography.

2. Description of the Prior Art

Inorganic porous materials such as silica, alumina, diatomaceous earth and the like have been used as solid supports for liquid chromatography. However, in accordance with the requirement of high speed for the liquid chromatography, various solid supports such as ones having a glass bead core and a porous silica surface layer and coating or chemically bonding an organic material onto said inorganic porous surface carrier, inorganic porous carrier and other organic polymer gels, have been developed and widely used.

The solid supports prepared by coating or chemically bonding an organic compound onto inorganic porous carriers or said inorganic porous surface carriers, and organic polymer gels have been used for partition chromatography. These solid supports have advantages and disadvantages. The solid support prepared by coating or chemically bonding an organic material onto an inorganic porous carrier or an inorganic porous surface carrier, have the disadvantages that a precolumn is needed, the mediums suitable for the mobile phase are limited and the types of organic materials suitable for chemically bonding is small. On the other hand, organic polymer gels have the disadvantage of a high degree of swelling.

SUMMARY OF THE INVENTION

It is an object of the present invention to provide a process for preparing a solid support for liquid chromatography which has high separating power, a low degree of swelling, increased sample load and wherein no extraction of the polymer on the solid support occurs.

This and other objects of the present invention have been attained by preparing a solid support for liquid chromatography which comprises impregnating a porous inorganic particles having a specific surface area of 5 to 1500 m$^2$/g, an average micropore diameter of 20 to 2000 Å and a particle diameter of 1 μm to 1 mm with a free radical polymerizable monomer, a crosslinking agent and a free radical polymerization initiator; polymerizing the monomer with crosslinkage and extracting the soluble polymer to form a crosslinked polymer at a ratio of 5 to 50 wt.% based on the inorganic particles. The porous inorganic particles are selected from the group consisting of silica, alumina, zeolite, porous glass and carbon gel. It is possible to introduce functional groups into the organic polymer of the solid support.

DETAILED DESCRIPTION OF THE EMBODIMENTS

Typically, the solid supports are prepared as follows. The free radical polymerizable monomer, a conventional free radical polymerization initiator and a crosslinking agent are adsorbed onto the surface of silica, alumina, zeolite, porous glass or carbon gel and crosslinking polymerization of the monomer is conducted in a nitrogen atmosphere or in a vacuum. After the polymerization, the extractable materials are extracted with a suitable solvent to remove them. The free radical polymerizable monomers used in the preparation include vinyl monomers such as styrene, vinyl acetate, vinyl chloride, acrylonitrile, acrylic acid, methyl acrylate, etc.; vinylidene monomers such as methyl methacrylate, methacrylonitrile, vinylidene chloride, etc.; the diene monomers such as butadiene, chloroprene and the other free radical polymerizable monomers. The crosslinking agents include divinyl compounds such as divinyl benzene, 1,5-hexadiene-3-yne, hexatriene, divinyl ether, divinylsulfone, etc. and diallyl compounds such as allyl phthalic acid, 2,6-diacrylphenol, diallyl carbinol, etc. The monomers can be selected so as to prepare solid supports having various groups. This is a remarkable advantage of the invention.

The polymerization initiators can be conventional free radical initiators which include organic peroxides such as diacyl peroxides such as lauroyl peroxide, benzoyl peroxide, acetyl peroxide, etc.; alkyl peroxides such as dicumyl peroxide, di-tert-butyl peroxide; peroxy esters such as tert-butyl peroxybenzoate, tert-butyl peroxyoctoate, tert-butyl peroxyazelate, tert-butyl peroxyisobutylate, tert-butyl peroxypivalate, etc., and azo compounds such as azobisisobutyronitrile, azobisisovalero nitrile, etc. The amount of the polymerization initiator is usually in the range of 1 to 15 wt.% based on the monomer. Although the amount of polymerization initiator is about 0.1 wt.% to the monomer in the conventional polymerization, it is necessary to add a large excess, such as more than 1 wt.%, of the polymerization initiator. It is considered that when the polymerization initiator is dissolved in the monomer and is adsorbed on the inorganic particles, the polymerization initiator is nonuniformly adsorbed and is locally distributed. When the amount of the polymerization initiator is less than 1 wt.%, the polymerization velocity is exceedingly slow. The amount of the crosslinking agent can be more than 1 wt.% to the monomer. When the amount of the crosslinking agent is too small, the ratio of crosslinked polymer decreases thereby increasing the amount of the polymer extracted from the solid support in the extraction step. When the amount of the crosslinking agent is too large, the functional properties, such as polarity, hydrophilic property, which are derived from the monomer are too low. Accordingly, the amount of the crosslinking agent is preferably in the range of 2 to 20 wt.% based on the monomer. However, the crosslinking agent itself is a monomer. Accordingly, if the crosslinking agent used is a monomer having the desired properties, it is possible to use only the crosslinking agent without using any other polymerizable monomer.

The polymerization is usually conducted at 20° to 150° C, preferably 50° to 80° C.

When the amount of the crosslinked polymer adhered on the inorganic solid support is not enough, the separation of a sample is not satisfactory. On the other hand, when it is too much, the micropores of the inorganic particles are closed whereby the separation of a sample is not satisfactory. Accordingly, in order to obtain satisfactory sample separation it is necessary to control the amount of the crosslinked polymer. The optimum amount of the crosslinked polymer is dependent upon the type of inorganic particle. When inorganic particles having a large specific surface area are used, the optimum amount of the crosslinked polymer is large. When the inorganic particles having relatively small specific surface area are used, the optimum amount of the crosslinked polymer is relatively small. Typically the amount of the crosslinked polymer which is not extracted with a solvent, including the crosslinking agent and the polymerization initiator, is preferably in the range of 5 to 50 wt.% based on the amount of the inorganic particles.

The solid support of the invention is a porous particles having an average specific surface area of 3 to 1000 m$^2$/g, an average micropore diameter of 10 to 1900 Å and a particle diameter of 1 μm to 1 mm. The amount of crosslinked polymer is usually controlled depending upon the amount of the adsorbed monomer, crosslinking agent and the polymerization initiator.

As stated above, the solid support of the invention can have the desired functional group on the surface thereof by selecting the proper monomer used for the crosslinking polymerization. When it is difficult to polymerize a monomer having the desired functional group with crosslinkage or there is no monomer having the desired functional group, it is possible to introduce the desired functional group into said crosslinked polymer by a chemical reaction. For example, when a solid support for liquid chromatography which has $SO_3H$ group is desired, styrene is polymerized with crosslinkage on the porous inorganic particles and then sulfonation of the product is conducted. It is also possible to prepare a solid support having special separation ability and characteristics by polymerizing two or more monomers with crosslinking. Typically, a solid support having high separation ability can be prepared by forming a smaller sized and spherical shaped particle compared with irregular shaped particles. It is preferable to use inorganic particles having a spherical shape and an average a diameter of 5 to 50 μ, when a solid support having high separation ability is needed.

The solid support of the present invention has characteristics such as high mechanical strength and low swelling property to many solvents. The solid support of the invention has a large specific surface area whereby the sample load can be increased, and the types of solvents are not limited because the crosslinked polymer is not dissolved by the solvents.

Having generally described the invention, a more complete understanding can be obtained by reference to certain specific examples, which are included for purposes of illustration only and are not intended to be limiting unless otherwise specified.

EXAMPLE 1

A mixture of 3.0 g of styrene monomer, 0.2 g of divinylbenzene and 0.1 g of tert-butyl peroxide was uniformly adsorbed on 10 g of silica gel having a specific surface area of 320 m$^2$/g (particle diameter of 20 to 25μ) in a vacuum and was polymerized at 70° C for 10 hours with shaking. After the polymerization, the extractable components were extracted with benzene in a Soxhlet's extractor for about 40 hours to obtain the solid support. After the extraction, the product was dried and the polymer addition ratio was determined by the following equation to be 29%.

$$\text{Polymer addition ration (\%)} = \frac{\text{non-extracted polymer (g)}}{\text{silica gel (g)}} \times 100$$

The solid support was packed in a column having a length of 1 foot and separation of a sample containing phenol, benzene, naphthalene and anthracene was conducted using methanol as the solvent. The separation chart is shown in FIG. 1.

For comparison, the separation of the same sample was conducted using an untreated silica gel as the solid support and the result is shown in FIG. 2 wherein the length of column, the solvent, the flow rate and the sample are same as those of FIG. 1. It is clear from FIGS. 1 and 2, that the four components were separated in high degree by using the crosslinked polymer coated silica gel, though no separation was found by using the untreated silica gel.

EXAMPLE 2

A mixture of 3.5 g of methyl methacrylate 0.35 g of divinylbenzene and 0.2 g of azobisisobutyronitrile was uniformly adsorbed on 10 g of silica gel having a specific surface area of 320 m$^2$/g (particle diameter of 20 to 25μ) in a vacuum, and was polymerized at 70° C for 24 hours with shaking. After the polymerization, the extractable components were extracted with acetone in a Soxhlet's extractor for about 40 hours to obtain a solid support. After the extraction, the product was dried and the polymer addition ratio was determined to be 37%. The solid support was packed in a column having a length of 1 foot and separation of a sample containing benzophenone, acetophenone and benzyl was conducted using methanol as the solvent. The separation chart is shown in FIG. 3. For comparison, the separation of the same sample was conducted by using untreated silica gel as the solid support and the result is shown in FIG. 4, wherein the length of column, the solvent, the flow rate and the sample are same as those of FIG. 3. It is clear from FIGS. 3 and 4, that the three components were separated in high degree by using the crosslinked polymethylmethacrylate coated silica gel, though no separation of benzophenone, acetophenone and benzyl was found by using the untreated silica gel.

EXAMPLE 3

A mixture of 1.4 g of styrene, 0.15 g of divinylbenzene and 0.15 g of tert-butyl peroxide was uniformly adsorbed on 10 g of alumina having a specific surface area of 160 m$^2$/g (particle diameter of 30μ) in a vacuum, and was polymerized at 70° C for 20 hours with shaking. After the polymerization, the extractable components were extracted with benzene in a Soxhlet's extractor for about 40 hours to obtain a solid support. After the extraction, the product was dried and the polymer addition ratio was determined to be 15%. The solid support was packed in a column having a length of 1 foot and separation of a sample containing benzene, naphthalene and anthracene was conducted by using methanol as the solvent. The separation chart is shown in FIG. 5. For comparison, the separation of the same sample by using a untreated alumina as the solid support and the result is shown in FIG. 6 wherein the length of column, the solvent, the flow rate and the sample are same as those of FIG. 5. It is clear from FIGS. 5 and 6, that the three components were separated in high degree by using a crosslinked polystyrene coated alumina, though no separation of benzene, naphthalene and anthracene was found by using the untreated alumina.

EXAMPLE 4

A mixture of 3.0 g of acrylonitrile 0.3 g of divinylbenzene and 0.3 g of tert-butyl peroxide was adsorbed on 10 g of silica gel having a specific surface area of 320 m$^2$/g (particle diameter of 20 to 25μ) in a vacuum, and was polymerized at 70° C for 20 hours with shaking. After the polymerization, the extractable components were extracted with N,N'-dimethylformamide in a Soxhlet's extractor for about 40 hours to obtain the solid support. After the extraction, the product was dried and the polymer addition ratio was determined to be 31%. The solid support was packed in a column having a length of 1 foot and the separation of quinone, naphthoquinone, benzanthraquinone was conducted by using methanol as the solvent. The separation chart is shown in FIG. 7. For comparison, the separation of the same sample was conducted using untreated silica gel as the solid support and the result is shown in FIG. 8 wherein the length of column, the solvent, the flow rate and the sample are same as those of FIG. 7. It is clear from FIGS. 7 and 8, that the three components were separated in high degree by using the crosslinked polyacrylonitrile coated silica gel, though no separation of quinone, naphthoquinone and benzanthraquinone was found by using the untreated silica gel.

EXAMPLE 5

The crosslinked polystyrene coated silica gel of Example 1 was treated with 10% fuming sulfuric acid at 40° C for 60 minutes to introduce sulfonic groups. The resulting solid support had an ion-exchange capacity of 1.8 meq/g. The solid support was packed in a column having a length of 50 cm and the separation of amino acids was conducted. The results are shown in the chart of FIG. 9 wherein 6 types of amino acids, aspartic acid, threonine, glutamic acid, glycine and alanine are separated in high degree.

EXAMPLE 6

The swelling degrees of the solid supports of Examples 1 and 2 were tested. For comparison, the swelling degrees of the untreated gel and polymer gel (styrene-divinylbenzene copolymer) were also tested. Acetone and tetrahydrofuran (THF) were used as the solvents. The results are shown in Table 1. The swelling degree is given by swelled gel (ml)/dried gel (ml).

Table 1

| Solid support | Swelling degree | |
|---|---|---|
| | Acetone | THF |
| Silica gel | 1.0 | 1.0 |
| Polystyrene coated silica gel | 1.1 | 1.1 |
| Polymethylmethacrylate coated silica gel | 1.1 | 1.1 |
| Polymer gel | 1.7 | 2.0 |

It is clear that the solid support of the invention had remarkably low swelling degree comparing with that of polymer gel.

EXAMPLE 7

The specific surface area of the solid supports of Examples 1, 2 and 4 were measured by B.E.T. method. For comparison, the specific surface area of silica gel was also measured. The results are shown in Table 2.

Table 2

| Solid Support | Specific Surface Area |
|---|---|
| Silica gel | 320 m²/g |
| Polystyrene coated silica gel | 170 " |
| Polymethylmethacrylate coated silica gel | 130 " |
| Polyacrylonitrile coated silica gel | 160 " |

As it is clear from the Table 2, the solid supports coated with the crosslinked polymers had relatively large specific surface area.

BRIEF DESCRIPTION OF DRAWINGS

A more complete appreciation of the invention and many of the attendant advantages thereof will be readily attained as the same becomes better understood by reference to the following detailed description when considered in connection with the accompanying drawings, wherein.

Figure 1:
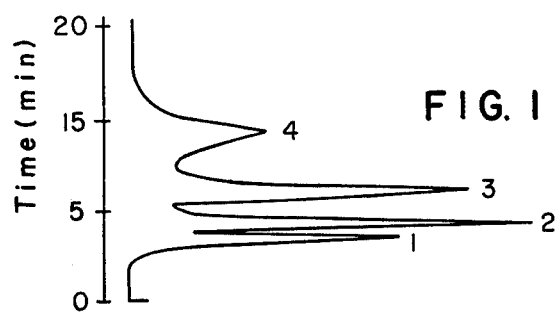
FIGS. 1 to 9 show charts of chromatographs resulting from the use of the solid supports for liquid chromatography prepared by the examples and the comparisons. The values at each time (minutes) from the injection of each sample are given in the charts.
Figure 2:
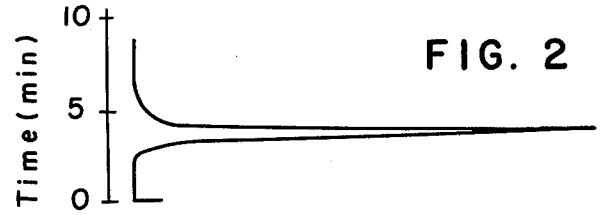
Figure 3:
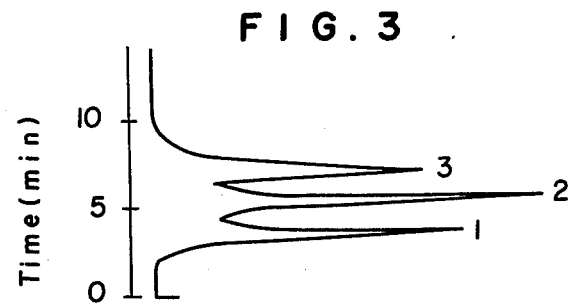
Figure 4:
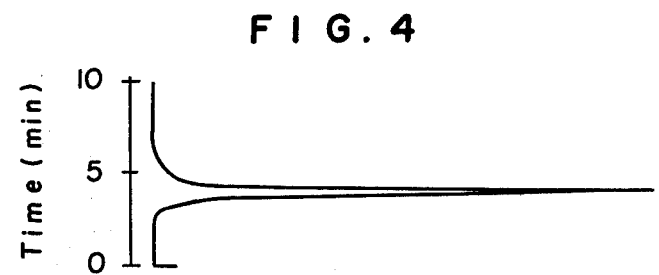
Figure 5:
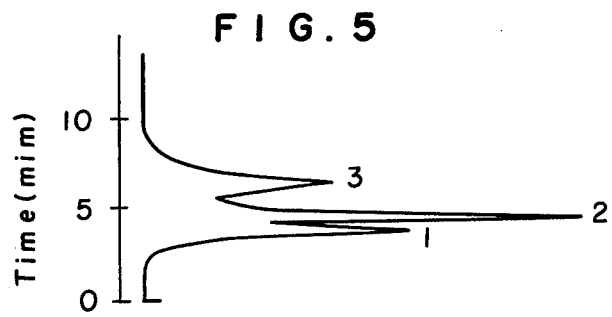
Figure 6:
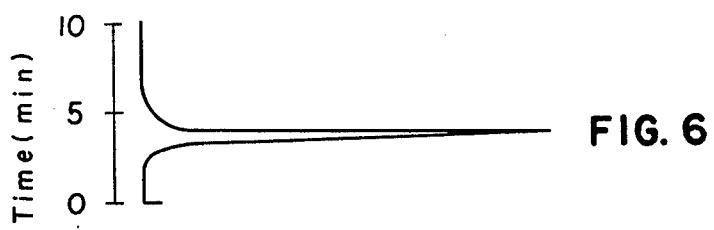
Figure 7:
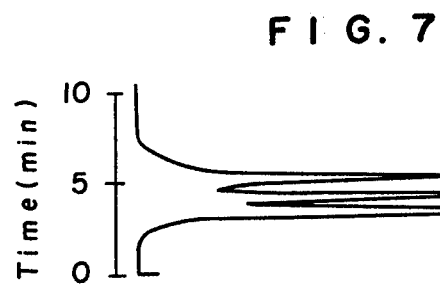
Figure 8:
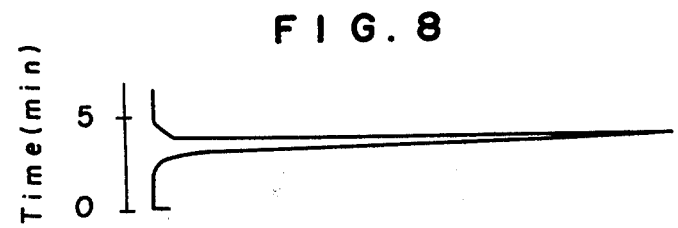
Figure 9:
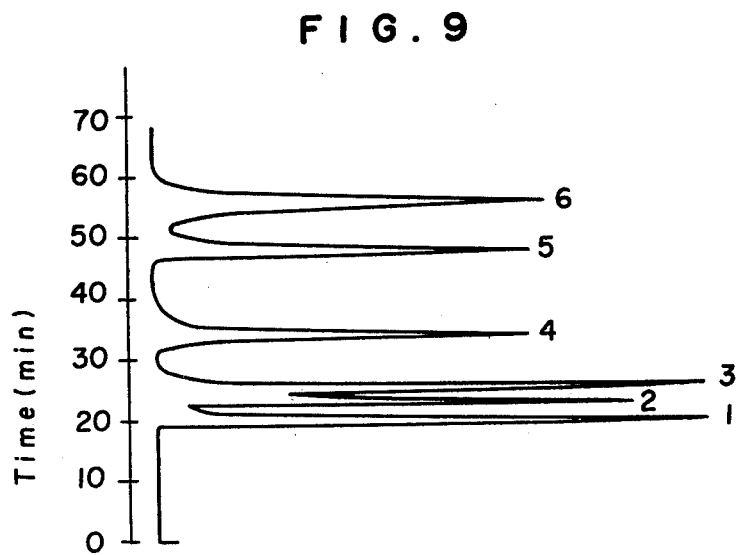

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A solid packing material for liquid chromatography prepared by the process which comprises impregnating inorganic, porous particles having a specific surface area of 5 to 1500 m²/g, an average pore diameter of 20 to 2000 Å and a particle diameter of 1 μ to 1 mm with a free radical polymerizable monomer, selected from the group consisting of styrene and acrylonitrile, a crosslinking agent and a free radical polymerization initiator; polymerizing the monomer and crosslinking agent with crosslinkage; and extracting any soluble polymer to form a crosslinked polymer on and in the inorganic particles, the crosslinked polymer being present in an amount from 5 to 50 wt.% based on the inorganic particles.

2. The solid packing material of claim 1 wherein the crosslinking agent is the free radical polymerizable monomer.

3. The solid packing material of claim 1, wherein the free radical polymerization initiator is added at a ratio of more than 1 wt.% to the free radical polymerizable monomer.

4. The solid packing material of claim 1, wherein a mixture of the free radical polymerizable monomer, the crosslinking agent and the free radical polymerization initiator is adsorbed on the pores of said silica gel particles in a vacuum to impregnate it.

5. The solid packing material of claim 1, wherein the noncrosslinked polymer is extracted after the free radical polymerization with a solvent for the noncrosslinked polymer.

6. The solid packing material of claim 1, wherein said monomer is styrene and the crosslinking agent is a divinyl compound or diallyl compound.

7. In an apparatus for liquid chromatograhy the improvement which comprises a chromatographic column packed with a solid packing material comprising porous silica gel particles, having a specific surface area of 5 to 1500 m²/g, an average pore diameter of 20 to 2000 Å and a crosslinked polymer selected from the group consisting of polystyrene, sulfonated polystyrene, and polyacrylonitrile coating the surface of the fine holes of the porous silica gel particles in an amount of 5 to 50 wt.% of the polymer to silica gel particles, wherein said crosslinked polymer does not contain any extractable polymer.

8. A solid packing material for liquid chromatography which comprises porous silica gel particles, having a specific surface area of 5 to 1500 m²/g, an average pore diameter of 20 to 2000 Å and a crosslinked polymer selected from the group consisting of polystyrene, sulfonated polystyrene, and polyacrylonitrile coating the surface of the fine holes of the porous silica gel particles in an amount of 5 to 50 wt.% of the polymer to silica gel particles, wherein said crosslinked polymer does not contain any extractable polymer.

9. The solid packing material of claim 8, wherein said crosslinked polymer is crosslinked polystyrene.

* * * * *